US009967857B2

(12) United States Patent
Guo et al.

(10) Patent No.: US 9,967,857 B2
(45) Date of Patent: May 8, 2018

(54) METHOD AND DEVICE FOR READING SYSTEM MESSAGE

(71) Applicant: Huawei Technologies Co., LTD., Shenzhen (CN)

(72) Inventors: Xiaolong Guo, Shenzhen (CN); Qi Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 265 days.

(21) Appl. No.: 14/310,525

(22) Filed: Jun. 20, 2014

(65) Prior Publication Data

US 2014/0321381 A1 Oct. 30, 2014

Related U.S. Application Data

(63) Continuation of application No. PCT/CN2012/086528, filed on Dec. 13, 2012.

(30) Foreign Application Priority Data

Dec. 21, 2011 (CN) .......................... 2011 1 0432990

(51) Int. Cl.
*H04W 72/00* (2009.01)
*H04W 52/02* (2009.01)
(Continued)

(52) U.S. Cl.
CPC ..... *H04W 72/005* (2013.01); *H04W 52/0216* (2013.01); *H04W 52/0219* (2013.01);
(Continued)

(58) Field of Classification Search
CPC .................. H04W 72/005; H04W 52/0251
See application file for complete search history.

(56) References Cited

U.S. PATENT DOCUMENTS 6,480,504 B1 * 11/2002 Wang .................... H04W 68/00
370/335
6,628,946 B1 * 9/2003 Wiberg ................. H04W 48/12
370/331
(Continued)

FOREIGN PATENT DOCUMENTS

CN 1462122 A 12/2003
CN 1671240 A 9/2005
(Continued)

*Primary Examiner* — Rasheed Gidado
(74) *Attorney, Agent, or Firm* — Brinks Gilson & Lione

(57) ABSTRACT

The present invention discloses a method for reading a system message, including: receiving, by a terminal device, a paging message containing a system message state indication in a discontinuous reception (DRX) period, the terminal device includes a terminal device of which the DRX period is larger than a broadcast control channel (BCCH) modification period; determining, by the terminal device and according to the system message state indication in the paging message, that a system message state changes; reading and recording, by the terminal device, a system message corresponding to a current BCCH modification period, or reading and recording a system message corresponding to a next BCCH modification period immediately adjacent to the BCCH modification period; and communicating by the terminal device according to the read and recorded system message. Thus, the electric quantity of a battery can be saved, so that a UE can reduce power consumption.

6 Claims, 4 Drawing Sheets

(51) Int. Cl.
*H04W 68/00* (2009.01)
*H04W 76/04* (2009.01)

(52) U.S. Cl.
CPC ... *H04W 52/0229* (2013.01); *H04W 52/0251* (2013.01); *H04W 68/00* (2013.01); *H04W 76/048* (2013.01); *Y02B 60/50* (2013.01)

(56) References Cited

U.S. PATENT DOCUMENTS

| | | | |
|---|---|---|---|
| 8,190,144 B2* | 5/2012 | Chun | H04W 48/12 455/412.2 |
| 8,213,896 B2* | 7/2012 | Lee | H04W 4/22 455/404.1 |
| 8,666,393 B2* | 3/2014 | Faronius | H04W 68/02 370/311 |
| 2003/0198196 A1 | 10/2003 | Bahl et al. | |
| 2005/0101351 A1* | 5/2005 | Lee | H04W 68/00 455/558 |
| 2007/0287419 A1 | 12/2007 | Wang | |
| 2008/0219199 A1 | 9/2008 | Kohlmann et al. | |
| 2009/0318177 A1* | 12/2009 | Wang | H04W 68/025 455/515 |
| 2010/0195524 A1* | 8/2010 | Iwamura | H04W 76/048 370/252 |
| 2014/0086208 A1* | 3/2014 | Murray | H04W 36/0072 370/331 |
| 2014/0126447 A1* | 5/2014 | Koskinen | H04W 4/08 370/311 |

FOREIGN PATENT DOCUMENTS

| | | |
|---|---|---|
| CN | 1980452 A | 6/2007 |
| CN | 101111051 A | 1/2008 |
| CN | 101242654 A | 8/2008 |
| CN | 101459935 A | 6/2009 |
| CN | 101483850 A | 7/2009 |

* cited by examiner

METHOD AND DEVICE FOR READING SYSTEM MESSAGE

CROSS-REFERENCE TO RELATED APPLICATIONS

This application is a continuation of International Application No. PCT/CN2012/086528, filed on Dec. 13, 2012, which claims priority to Chinese Patent Application No. 201110432990.2, filed on Dec. 21, 2011, both of which are hereby incorporated by reference in their entireties.

TECHNICAL FIELD

The present invention relates to the field of communications and, in particular, to a method and a device for reading a system message.

BACKGROUND

In order to reduce electric quantity consumption of a terminal device and increase standby time, the terminal device will use a DRX (Discontinuous Reception, discontinuous reception) mode to receive data or use a DTX (Discontinuous Transmission, discontinuous transmission) mode to transmit data when the terminal device is in an idle state (idle) or in a state with no data being transmitted and received. Where, the DRX is a method for elongating service time of a battery in a radio communication system. Since the terminal device only needs to monitor the paging channel in the DRX group to which the terminal device belongs, rather than monitor the paging channel continuously, the electric quantity of the battery is saved.

Due to the diversified development of terminal devices, for example, taking a terminal device applied in M2M (Machine to Machine, machine to machine) technologies as an example, the terminal may be installed in an environment where it is impossible to be charged for long periods of time, thus, the requirement for saving power is particularly high. Although it is possible to save power by using the above-mentioned conventional DRX mechanism, the terminal still needs to wake up in a relatively short period, which cannot meet the requirement for saving power of the terminal device.

SUMMARY

The present invention provides a method and a device for reading a system message, so as to solve the problem of large power consumption of terminal devices, so that the terminal devices can achieve the purpose of saving power.

In one aspect, a method for reading a system message is provided, including:

receiving, by a terminal device, a paging message containing a system message state indication in a discontinuous reception (DRX) period, where the terminal device includes a terminal device of which the DRX period is larger than a broadcast control channel (BCCH) modification period;

determining, by the terminal device and according to the system message state indication in the paging message, that a system message state changes;

reading and recording, by the terminal device, a system message corresponding to a current BCCH modification period, or reading and recording a system message corresponding to a next BCCH modification period immediately adjacent to the BCCH modification period; and performing, by the terminal device, a communication according to the read and recorded system message.

In one aspect, an access method is provided, including:

before a terminal device initiates a service request to a mobility management entity (MME) or in an access process of initiating the service request, sending, by the terminal device, a global unique temporary identity (GUTI) of the terminal device to the MME if the terminal device determines that an area in which the terminal device is located currently is not a registered area of the terminal device, so that the MME obtains context of the terminal device according to the GUTI; where the terminal device includes a terminal device of which the location update is set to be disabled or reduced by a network; and initiating, by the terminal device, the service request to the MME.

In one aspect, a device for reading a system message is provided, where a DRX period of the device is larger than a broadcast control channel (BCCH) modification period, and the device includes:

a receiving unit, configured to receive a paging message containing system message state indication in a DRX period;

a determining unit, configured to determine, according to the system message state indication in the paging message received by the receiving unit, that a system message state changes;

a reading and recording unit, configured to read and record a system message corresponding to a current BCCH modification period, or read and record a system message corresponding to a next BCCH modification period immediately adjacent to the BCCH modification period after the determining unit determines that the system message state changes; and a communicating unit, configured to communicate according to the system message which is read and recorded by the reading and recording unit.

In one aspect, a device for initiating an access is provided, the device includes a device of which the location update is set to be disabled or reduced by a network; the device includes:

a determining unit, configured to determine that an area in which it is located currently is not a registered area of the terminal device itself;

a sending unit, configured to send, before a service request is initiated to a mobility management entity (MME) or in an access process of initiating the service request, a global unique temporary identity (GUTI) of the device itself to the MME when the determining unit determines that the area in which the device is located currently is not the registered area of the terminal device itself, so that the MME obtains context of the terminal device according to the GUTI; and an initiating unit, configured to initiate the service request to the MME after the sending unit sends the GUTI of the device itself to the MME.

Through receiving the paging message which contains the system message state indication in the discontinuous reception (DRX) period, the terminal device determines that the system message state changes, thus there is no need for the terminal device with the requirement of saving power to monitor the paging channel all the time, thereby saving the electric quantity of the battery, and thus the UE can save power consumption.

For the MTC device UE of which the location update is set to be disabled or reduced, such as a power saving MTC device, it can access through a Service Request message containing the GUTI, thus, even if the Pool is replaced, the new MME can still find and obtain the context of the power saving MTC device through the GUTI. Thus, even if the pool and the MME is replaced for the MTC device UE, the context of the MTC device UE can still be obtained, so that normal services can be provided, and it will not happen that the services cannot be provided because of the lack of context.

BRIEF DESCRIPTION OF DRAWINGS

To describe technical solutions in embodiments of the present invention more clearly, the following briefly describes the accompanying drawings used in the description of embodiments, apparently, the accompanying drawings illustrate only some exemplary embodiments of the present invention, and those skilled in the art can derive other drawings from these drawings without creative efforts.

DESCRIPTION OF EMBODIMENTS

Figure 1:
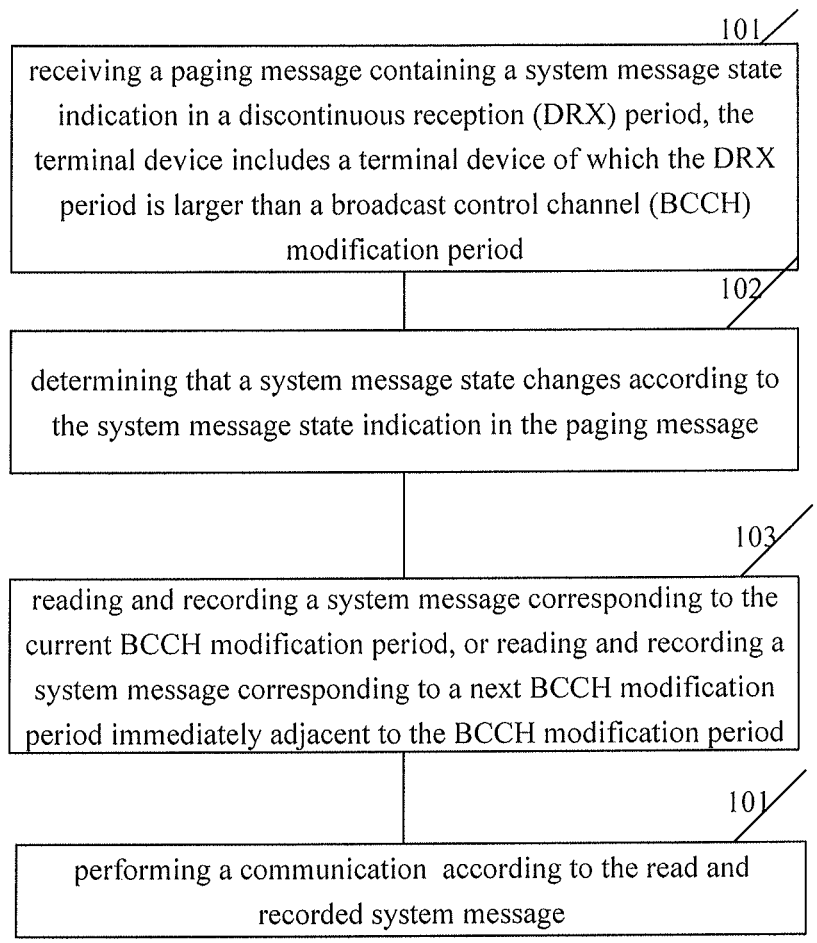
FIG. 1 is a schematic flow diagram of a method for reading a system message according to an embodiment of the present invention.

In order to make the objects, technical solutions and advantages of embodiments of the present invention more clear, the technical solutions in embodiments of the present invention are further described in detail with reference to the accompanying drawings, apparently, the embodiments described are only some exemplary embodiments of the present invention, rather than all embodiments. Other embodiments derived by those skilled in the art on the basis of embodiments of the present invention without any creative effort fall within the protection scope of the present invention.

Embodiments of the present invention are described by taking a LTE (Long Term Evolution, long term evolution) system as an example, and a UE (User Equipment, user equipment) is taken as an example for the terminal device. When the UE is in the idle (idle) mode, in order to save the service time of the UE battery, the UE only opens the receiver to monitor a paging message on the paging occasion (paging occasion) in the DRX period. And if the network pages the UE, the network only pages the UE on the paging occasion of the DRX period. In the paging occasion, the UE checks whether there is a corresponding paging message on a physical downlink control channel (PDCCH, Physical Downlink Control Channel) via a paging radio network temporary identifier (P-RNTI, Paging Radio Network Temporary Identifier); if there is a paging message, the UE obtains the paging message on a scheduling resource of a physical downlink shared channel (PDSCH, Physical Downlink Shared Channel), and checks whether the paging message carries the paging for the UE, for example, through checking whether there is a NAS (Non Access Stratum, non access stratum) identifier or system message change indication of the UE, if there is, the UE responds to the paging or reads the changed system message, and there is no need to monitor the paging channel all the time, thereby the electric quantity of the battery can be saved.

Since most of system messages cannot be changed in one BCCH (broadcast control channel, broadcast control channel) modification period (Modification Period), if a system message changes, the change of the system message and the sending of the changed system message can only be started in the next BCCH Modification Period immediately adjacent to the BCCH Modification Period, thus, in order to learn the changed system message, the UE should "wake up" in the BCCH Modification Period, that is, opening the receiver and reading the PDCCH channel at least once through the DRX mode, so as to learn whether the system message changes, thereby determining whether to read the new system broadcast message in the next BCCH Modification Period.

Due to the diversified development of terminal devices, for example, taking a terminal device applied in machine to machine (M2M, Machine to Machine) technologies as an example, these terminal devices may be installed in an environment where it is impossible to be charged for long periods of time, such as wild animal tracing, thus, the requirement for saving power is particularly high. Although it is possible to save power by using the abovementioned conventional DRX mechanism, it still needs to wake up in a relatively short period, which cannot meet the requirement for saving power of the terminal device which needs large power consumption.

In order to solve the above technical problem, the present invention provides the following technical solutions:

FIG. 1 is a flowchart of a method for reading a system message according to an embodiment of the present invention, including:

101, a terminal device receives a paging message containing a system message state indication in a discontinuous reception (DRX) period, where the terminal device includes a terminal device of which the DRX period is larger than a broadcast control channel (BCCH) modification period;

102, the terminal device determines that a system message state changes according to the system message state indication in the paging message;

103, the terminal device reads and records a system message corresponding to a current BCCH modification period, or, reads and records a system message corresponding to a next BCCH modification period immediately adjacent to the BCCH modification period; and

104, the terminal device performs a communication according to the read and recorded system message.

Through receiving the paging message which contains the system message state indication in the discontinuous reception (DRX) period, the terminal device determines that the system message state changes, thus there is no need for the terminal device with the requirement of saving power to monitor the paging channel all the time, thereby saving the electric quantity of the battery, and thus the UE can save power consumption.

Figure 2:
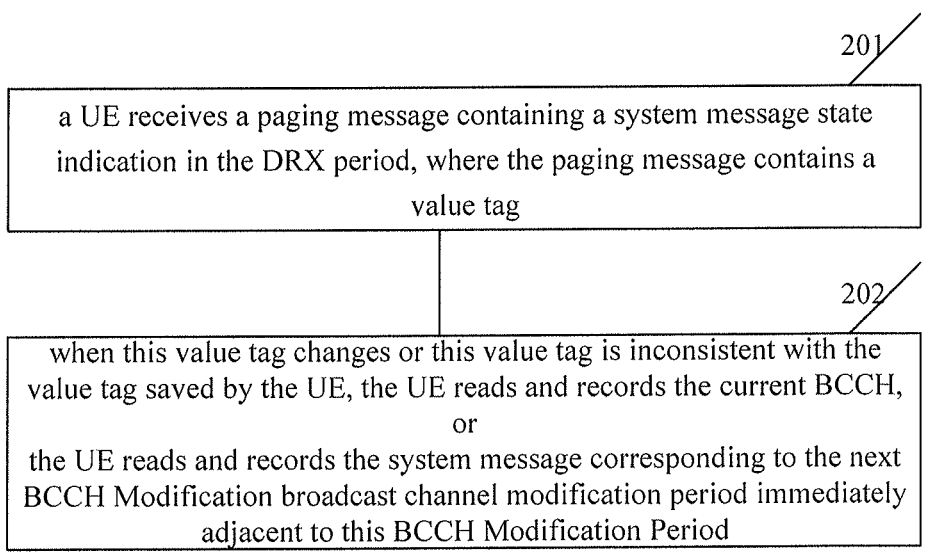
FIG. 2 is a schematic flow diagram of a method for reading a system message according to another embodiment of the present invention.

FIG. 2 is a flowchart of a method for reading a system message according to an embodiment of the present invention. The terminal device will be described by taking a UE as an example in embodiments of the present invention, however, the terminal device includes but is not limited to the UE. The UE includes a UE of which the DRX period is larger than the BCCH modification period. This embodiment includes:

201, a UE, of which the DRX period is larger than the BCCH modification period, receives a paging message containing a system message state indication in the DRX period, where the paging message contains a value tag (value tag).

The change of this value tag corresponds to the change of the BCCH modification period, that is, the value tag changes along with the system broadcast message in the BCCH modification period or the DRX period, for example, the value tag is increased by 1; and further, the DRX period may also be a multiple of the above BCCH modification period, such as an integer multiple greater than 2; the UE records the value tag of the last received system broadcast message.

202, when this value tag changes or this value tag is inconsistent with the value tag saved by the UE, the UE reads and records the current BCCH, or the UE reads and records the system message corresponding to the next BCCH Modification broadcast channel modification period immediately adjacent to this BCCH Modification Period.

Where, the UE may compare the value tag included in the paging message with the value tag saved by itself, if the value tags are inconsistent, then the UE considers that the system message saved by itself has expired, it is needed to re-read and record the system message corresponding to the current BCCH Modification Period or read and record the system message corresponding to the next BCCH Modification Period immediately adjacent to this BCCH Modification Period.

The terminal device mentioned in this embodiment includes a terminal device being in an idle state, and also includes a machine type communication device (MTC, Machine Type Communication Device) which requires a long power-on time of the battery; the MTC Device with the requirement for saving power is generally called Power Saving MTC Device, and the Power Saving MTC Device may be a UE or an MTC Device of which the Power Saving characteristic has already been activated.

The implementing mode of the embodiment shown in FIG. 2 will be described more specifically by taking a LTE system as an example:

In the LTE system, a paging message sent by the system includes a value tag, and this value tag may be consistent with the value tag in the current system broadcast message, and may also be a value tag set specially for the terminal device of which the DRX period is larger than the BCCH modification period. If the value tag which is consistent with the value tag in the system broadcast message is used, then this value tag is consistent with the value tag of which the value is 0-31 in the system broadcast message. The value tag in the system broadcast message is sent through the system information block type 1 (SIB1, System Information Block Type 1) message, and this value tag will change each time the system broadcast message changes, for example, being increased progressively by 1 and reset to 0 when reaching a maximum value of 31.

The paging message sent by the system includes the value tag consistent with the current system broadcast message; the UE may know whether the system broadcast message changes through comparing whether the value tag in the paging message changes, that is, through comparing the value tag in the paging message with the newest value tag saved by the UE itself. Here the range of the value tag may be the value tag range in prior art, that is 0-31, and may also be the value of the value tag set specially for the requirement for saving power, such as 0-255, thus, power consumption of the UE may be further reduced.

If the value tag changes, the UE reads and records the system message corresponding to the current BCCH modification period, or reads and records the system message corresponding to the next BCCH Modification Period immediately adjacent to this BCCH Modification Period, and records the corresponding newest value of the value tag. For another example, if the system message changes and the UE is paged in the period out of coverage (out of coverage), but the UE does not receive, the method of comparing the value tag in the system message may also be used to obtain the situation that the system message has changed; if the UE determines that the system message has changed, then the UE may read and record the system message corresponding to the current BCCH modification period, or read and record the system message corresponding to the next BCCH Modification Period immediately adjacent to the current BCCH Modification Period. Further, the UE without special requirement for saving power may be set not to receive the value tag, for example, be set to ignore the value tag in the paging message; the value tag added in this method may be only for the terminal device which needs the special requirement for saving power, for example, the power saving MTC Device may receive the value tag, while an ordinary UE may not have to read this value, or may ignore the value tag in the paging message.

Specifically, the representation of the value tag added in the paging message may include: the value tag (ValueTag) added in the field format of the paging message, for example:

```
Paging ::=              SEQUENCE {
    ...                     ...
    ...
    ValueTag                INTEGER (0..31)
    OPTIONAL,  -- max maybe 31 or even bigger value such as 255.
```

Furthermore, for the terminal device which will only wake up in the DRX period, for example, a power saving machine type communication terminal device (power saving MTC Device), the value tag may be added only in the paging message of the DRX period. If there is no change in the system message in the DRX period, then the value tag may not be added in the paging message, so as to save the broadcast overhead of the paging message. Thus, it is avoided that the network sends the paging message carrying the value tag all the time, thereby reducing the system overhead.

Figure 3:
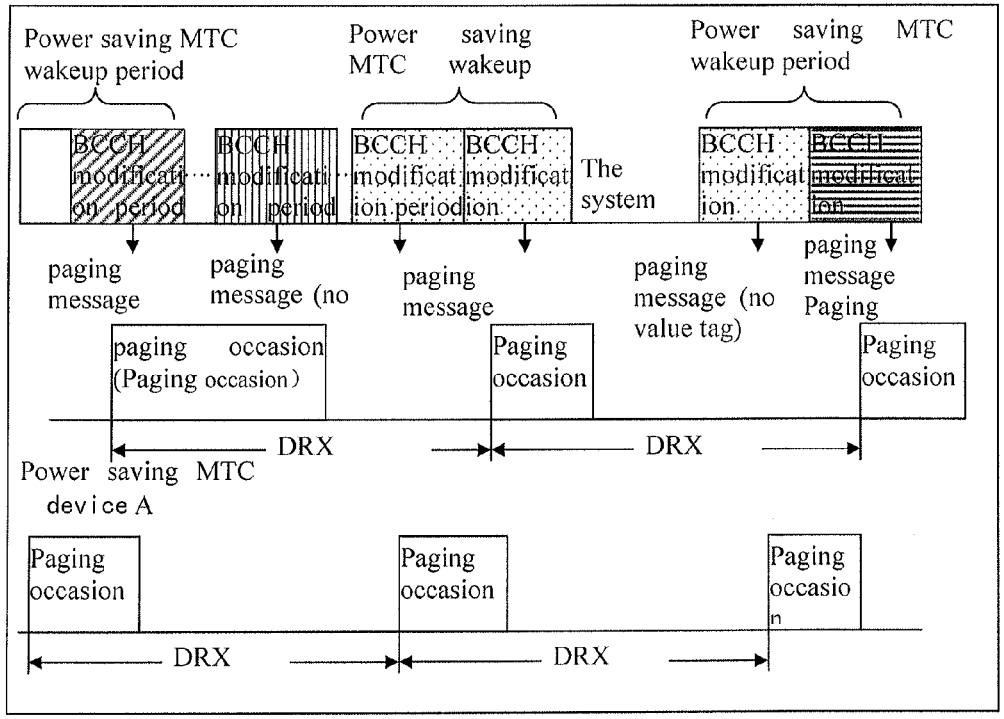
FIG. 3 is a schematic diagram of a wakeup period of a power saving MTC device in an embodiment of a method for reading a system message according to the present invention.

FIG. 3 is a schematic diagram of a wakeup period of a power saving MTC device in an embodiment of a method for reading a system message according to the present invention; as shown in FIG. 3, if the power saving MTC device is stipulated to wake up only in the DRX period, for example, all power saving terminal devices or all power saving terminal devices having the time tolerant characteristic only wake up at the DRX period time, the period time may be determined by subscribing or set and broadcasted by the network or negotiated with the terminal device, then the value tag added in the paging message may only be added at the wake time of these devices.

If all the power saving MTC Devices must "wake up" once in the wakeup period (wakeup period), when there is no change of the system message between two wakeup periods, then the value tag may not be added in the paging message sent in the subsequent periods, for example, the paging message in the <s>-th BCCH Modification Period may not carry the value tag, thus, the power saving MTC Device (such as power saving MTC Device B) which wakes up during the DRX period (within the <s> BCCH modification period) considers, after receiving this paging message, that the system message does not change; if the subsequent <t>-th system message just changes, then the paging message in this period (within the <t> BCCH modification period) also needs to carry the value tag, thus, when the power saving MTC Device (such as power saving MTC Device A) receives this paging message, it compares the value tag in the paging message with the value tag saved by itself, and if the comparison result is "inconsistent", the UE needs to re-read the new system message.

The value tag may be a special value tag, for example, the value tag may have only two values 0 or 1; 1 represents that a change in the system message has occurred, and 0 represents no change, or vice versa. Or, the value tag may be an optional parameter; carrying no value tag means that the system message does not change, and carrying the value tag means that the system message has changed, or vice versa. In addition, the value tag may also be set to be read only by the power saving MTC Device, and will not be read by an ordinary UE; the ordinary UE refers to the UE without special requirement for saving power, where, whether to have the requirement for saving power may be set or activated by the UE itself, or set or activated by the network according to the subscribing condition.

It can make the UE with the requirement for saving power, such as a power saving MTC device, know the change of system messages in the relatively long DRX period by adopting the technical solution of using the value tag according to the embodiment shown in FIG. 2. As long as the system message changes in the DRX, the power saving MTC Device can know whether the system message changes since the reception last time via the change of the value tag or whether there is a value tag parameter, so as to facilitate the UE to decide whether to re-read the system message. If the UE finds that the value tag is equal to the value saved by itself or the UE does not receive a special value tag parameter, there is no need to re-read the system message.

Figure 4:
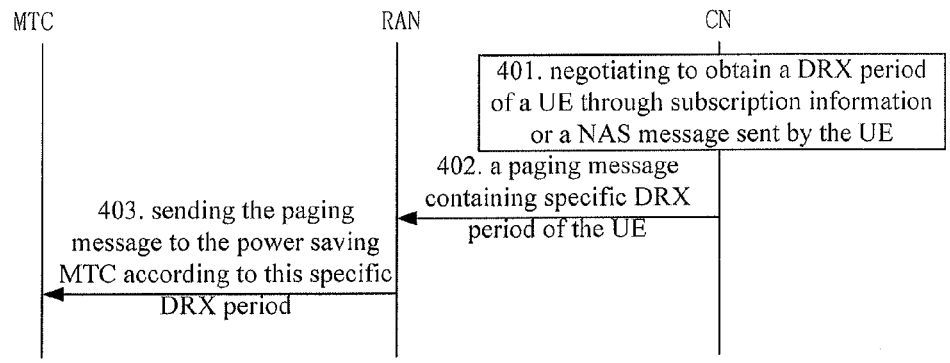
FIG. 4 is a schematic flow diagram of a method for reading a system message according to another embodiment of the present invention.
Figure 5:
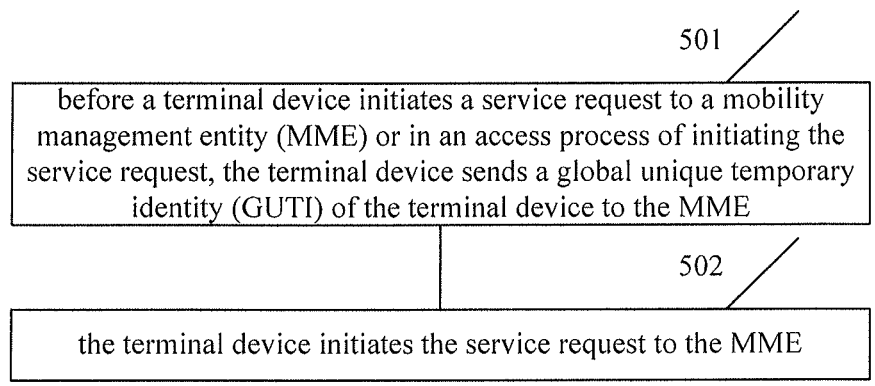
FIG. 5 is a schematic flow diagram of an access method according to the present invention.

The terminal device in embodiments of the present invention will be described by taking a device specifically for the implementing procedure of paging of the power saving MTC device having a special requirement for saving power as an example. FIG. 4 is a flowchart of implementing paging of a power saving MTC device having a special requirement for saving power in an embodiment of a method for reading a system message according to the present invention, as shown in FIG. 4, including:

401, a CN may negotiate to obtain a DRX period of a UE through subscription information or a NAS message sent by the UE.

402, a radio access network (Radio Access Network, RAN) receives a paging message which is sent by the core network (Core Network, CN) and contains specific DRX period indication set for a power saving MTC UE (i.e., long DRX set for the power saving UE).

403, the RAN forcibly sends the paging message to the power saving MTC according to this specific DRX period (the default DRX of the RAN is ignored), rather than selects one relatively small DRX from the DRX carried by the CN and the DRX of the RAN itself as the DRX of the UE according to the conventional manner.

In step 403, the RAN knows the time at which the power saving MTC "wakes up" via the specific DRX period, so as to send paging only at the time when the power saving MTC "wakes up".

During the process of initiating paging, the power saving MTC receives the paging message within the DRX period according to the method described in the embodiment of FIG. 1. The specific DRX period may be reported by the power saving MTC UE, and may also be set by the network, or may be obtained through a negotiation between the power saving MTC and the network (for example, selecting a minimum value from the power saving MTC report and the network tendency).

In summary, by using the technical solution according to the embodiment shown in FIG. 1, the UE terminal device may learn the change of the system message through the change information of the value tag in the paging message, thereby obtaining the newest system message by reading and recording the system message corresponding to the current or next BCCH modification period, which ensures the sensitivity of the terminal device to the change of the system message in the DRX period. For example, by using the existing value tag, the range of which is 0-31, the value tag method or special indication method can both set the DRX to a maximum of 32 times the BCCH Modification Period, the saved power of which is about 32 times that of the conventional method, that is, the power consumption is only about $\frac{1}{32}$ of the conventional method. And if a new power saving value tag is introduced, that is, the existing value tag in the existing system broadcast message is not used, instead the new value tag is added for power saving users, for example, the value is 0-255, then the power can be further saved, reaching $\frac{1}{256}$ of the conventional method. Of course, even greater value can be taken, and the resulting overhead is that the corresponding paging response time of the power saving user will be longer.

The RAN may notify the CN whether the RAN supports the power saving function via an S1 Setup Request or an eNB Configuration Update message, so that the CN can decide waiting time or decide whether to issue DRX information of the UE when issuing the paging in the case that the eNB does not support power saving. The RAN may also indicate the UE whether the RAN supports the power saving function by carrying information in the system broadcast information; if the RAN does not support the power saving function, the UE cannot start the long DRX mechanism of the present invention.

Since most MTC devices have a small amount of data or have the MO only characteristic (i.e., only the terminal device can initiate access, but the network cannot page the terminal device), that is, no paging requirement; or are set to be time controlled (Time Controlled) is set, that is, services can only exist in a certain time; or have characteristics such as low mobility, the power of the MTC device with the requirement of saving power (power saving MTC Device) can be saved by reducing signaling. For example, open the function of disabling location update by opening the power saving (power saving) requirement of the power saving MTC Device, reduce or disable the periodic location update of the power saving MTC Device, and even reduce or disable all location update, where the reduced or disabled location update may include the normal location update across location areas or periodic location update. The method of reducing or disabling the location update may be for all MTC devices having the requirement of saving power, and may also be for the MTC device having the above characteristics.

The MTC device can prohibit or reduce the location update when a periodic location update timer expires; if all location update is reduced or prohibited, it may cause that the power saving MTC Device moves out of the MME (mobility management entity, mobility management entity) pool (Pool) area, but the MTC Device fails to send location update. For example, the MTC device originally registers on one MME in the MME pool 1 (MP1 for short); when the MTC device in the idle state moves into another MME Pool area, such as moving from eNB3 to eNB4, the MTC device needs to initiate location update according to the prior art, so as to register on the new MME; the new MME obtains the context of the MTC device from the old MME, and the new MME allocates a new S-TMSI for the MTC device in the location update process; thus, when the MTC device initiates an access, for example, initiates the access by sending a service request (Service Request), where the Service Request message carries the S-TMSI information; and the S-TMSI can be repeated in MMEs of different Pools, because the S-TMSI is composed of MMEC (MME Code) and M-TMSI, where the MMEC is used for allowing the eNB to select the MME node registered in the pool, and the M-TMSI is unique in the MME and used for finding the context of the MTC device in the MME.

For a power saving MTC device, if the power saving MTC device originally registers on MME1 in a Pool, and then moves to another Pool (such as moving from MP1 to MP2), and does not send location update during this time (for example, a device in the idle state does not initiate location update in the process of moving from eNB3 to eNB4), when the Power Saving MTC device initiates a Service Request subsequently, if a MME of which the MMEC is the same as that of the original MME1 exists in the new Pool, then the eNB selects this MME for the MTC device; the MME finds the context of the MTC device via S-TMSI, however, in fact this context of the MTC device is not the real context of this power saving MTC Device, but of another terminal device, the fact is just that the S-TMSI allocated for this terminal device is the same as the S-TMSI of the power saving MTC device, thereby causing wrong allocation. Or even if there are no UEs corresponding to the same S-TMSI or MMEs corresponding to the same MMEC, the new MME cannot find corresponding context of the terminal device, because the address of the old MME cannot be determined only through S-TMSI, thus it causes a communication error resulting from no corresponding context of UE.

Therefore, in order to solve the above problem, the present invention provides a method for initiating an access, including:

501, before a terminal device initiates a service request to a mobility management entity (MME) or in an access process of initiating the service request, the terminal device always sends a global unique temporary identity (GUTI) of the terminal device to the MME, so that the MME obtains context of the terminal device according to the GUTI; the terminal device includes a terminal device of which the location update is set to be disabled or reduced by a network;

502, the terminal device initiates the service request to the MME.

For a MTC device UE of which the location update is set to be disabled or reduced, such as a power saving MTC device, it can access through a Service Request message containing the GUTI, thus, even if the Pool is replaced, the new MME can still find and obtain the context of the power saving MTC device through the GUTI. Thus, even if the pool and the MME are replaced for the MTC device UE, the context of the MTC device UE can still be obtained, so that normal services can be provided, and it will not happen that the services cannot be provided because of the lack of context.

Figure 6A:
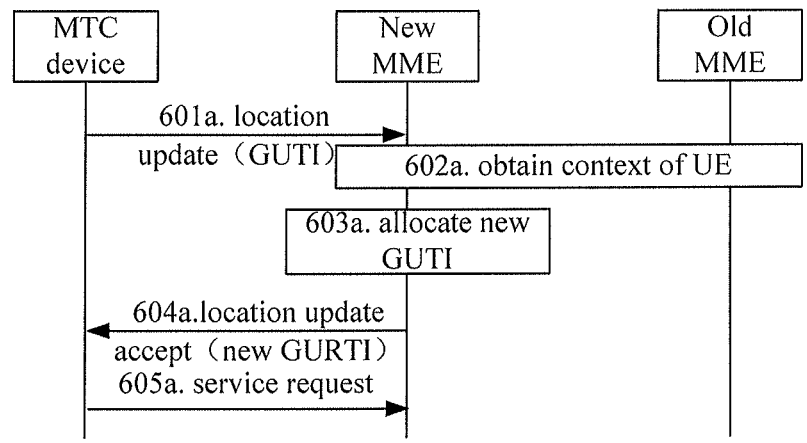
FIG. 6*a* is a schematic flow diagram of another access method according to the present invention.

As shown in FIG. 6a, a terminal device initiating an access method in this embodiment will be described by taking a MTC device as an example, which includes but is not limited to the MTC device; this embodiment includes:

601a, before initiating an access, a MTC device of which the location update is set to be disabled, it firstly initiates a location update request to a MME; the location update request contains a global unique temporary identity (GUTI, Global Unique Temporary Identity) of the MTC device.

602a, the MME receives the location update request, and obtains context of the MTC device according to the GUTI. If the MME does not change, that is, the GUMMEI in the GUTI is just the identity of accessing the MME, this step is not required.

603a, if the MME changes, the new MME allocates a new GUTI for the MTC device.

The new GUTI may be achieved through the GUTI Reallocation procedure, and may also be sent to the UE through a location update accepting message. The GUTI is composed of a PLMN-id, a MME Group id and an S-TMSI together, which may be represented as PLMN-id+MME Group id+S-TMSI. Even if the Pool is changed, the new MME can find and obtain the context of the MTC device through the GUTI, and allocate a new GUTI for the MTC device, such as a power saving MTC device. A new GUTI may also be allocated for the UE when the MME does not change.

604a, the new MME sends the location update accepting message to the MTC device.

605a, the MTC device sends a service request message (carrying the S-TMSI of the UE, or may even not carry) to the MME.

Figure 6B:
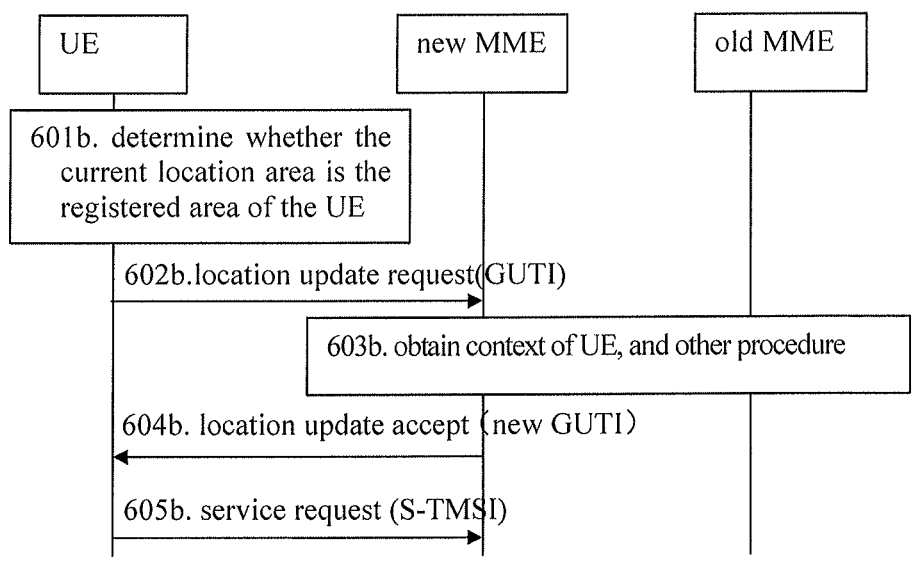
FIG. 6*b* is a schematic flow diagram of another access method according to the present invention.

The embodiment shown in FIG. 6b is similar to the embodiment shown in 6a, except that:

601b, in order to avoid resource waste resulting from initiating re-access to the same MME by the UE in the case that the MME does not change, the MTC device may determine whether the current location area is the registered location area of the MTC device before initiating the access; if it is the registered location area of the MTC device, there is no need to initiate the location update, and steps 602b, 603b, 604b are omitted. Otherwise, steps 602b, 603b (this step is not necessary if the new MME finds the UE context locally), 604b, 605b are performed sequentially.

Figure 7:
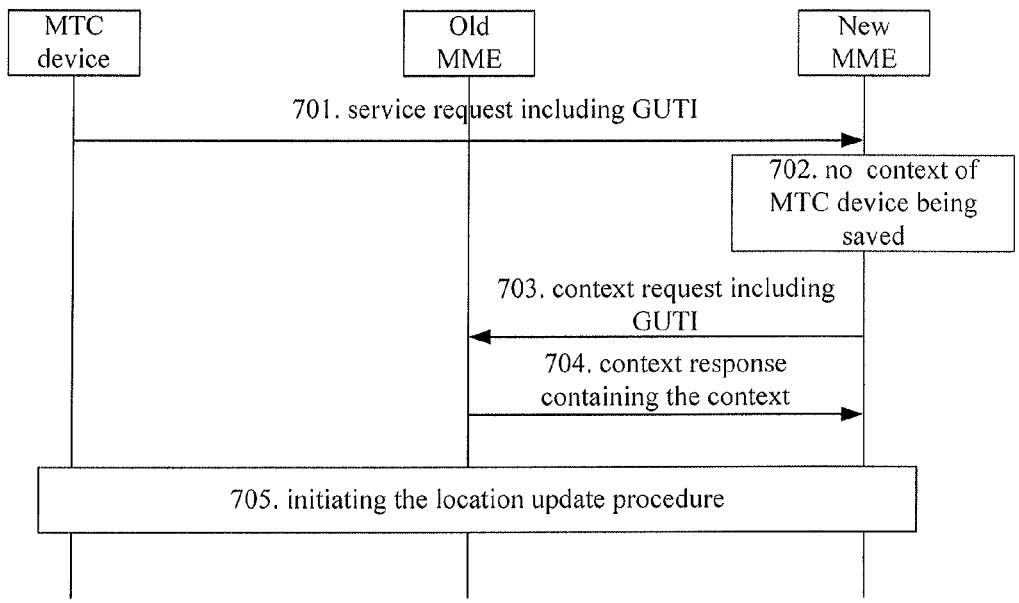
FIG. 7 is a schematic flow diagram of another access method according to the present invention.

For a MTC device UE of which the location update is set to be disabled or reduced, such as a power saving MTC device, it can also access through a Service Request message containing a GUTI, instead of initiating location update. FIG. 7 is a specific flowchart of initiating location update by sending a service request in a method for reading a system message according to another embodiment of the present invention. The terminal device in this embodiment will be described by taking a MTC device as an example, which includes but is not limited to the MTC device; the specific procedure is shown as FIG. 7:

701, for a MTC device of which the location update is set to be disabled, the MTC device sends a service request (Service Request) to a new MME, the Service Request includes a GUTI rather than a S-TMSI.

702, according to the GUTI, the new MME determines that the new MME does not save the MTC device context.

703, the new MME sends a context request (Context Request) to the old MME, the context request contains the GUTI.

704, according to the GUTI, the old MME sends a context response to the new MME, the context response contains the MTC device context.

705, after the new MME obtains the MTC device context, the general location update procedure of MTC devices is initiated then.

The old MME in this specific procedure refers to a MME on which the MTC device registers before accessing, and the new MME refers to a new MME which the MTC device selects and registers after accessing.

If the MTC device accesses the old MME, this MME finds the context of the MTC device according to the GUTI provided by the MTC device, and provides services.

For a MTC device UE of which the location update is set to be disabled or reduced, such as a power saving MTC device, it can access through a Service Request message containing the GUTI, instead of initiating the location update procedure before, thus, even if the Pool is replaced, the new MME can still find and obtain the context of the power saving MTC device through the GUTI. Thus, even if the pool and the MME is replaced for the MTC device UE, the context of the MTC device UE can still be obtained, so that normal services can be provided, and it will not happen that the services cannot be provided because of the lack of context.

Of course, the UE may also determine whether the current location area is the registered location area of the MTC device before initiating the access; if it is the registered location area of the MTC device, then the normal service request procedure (carrying the S-TMSI) is initiated directly. Otherwise, the service request procedure carrying the GUTI is initiated.

The power of the device being in the idle state can be effectively saved by adding the DRX or avoiding unnecessary signaling, the standby time of the device is improved, and effective support is provided for those applications which cannot be charged or cannot replace the battery for long periods of time.

Figure 8:
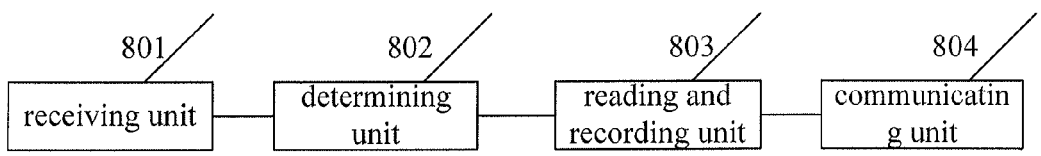
FIG. 8 is a schematic structural diagram of a device for reading a system message according to the present invention.

FIG. 8 is a schematic structural diagram of a device for reading a system message according to the present invention. As shown in FIG. 8, the DRX period of the device is larger than a broadcast control channel (BCCH) modification period; the device includes:

a receiving unit 801, configured to receive a paging message containing system message state indication in a DRX period;

a determining unit 802, configured to determine, according to the system message state indication in the paging message received by the receiving unit, that a system message state changes;

a reading and recording unit 803, configured to read and record a system message corresponding to a current BCCH modification period, or read and record a system message corresponding to a next BCCH modification period immediately adjacent to the BCCH modification period after the determining unit determines that the system message state changes; and a communicating unit 804, configured to perform a communication according to the system message which is read and recorded by the reading and recording unit.

For the device provided by this embodiment of the present invention, through receiving the paging message which contains the system message state indication in the discontinuous reception (DRX) period, the device determines that the system message state changes, thus there is no need for the terminal device with the requirement of saving power to monitor the paging channel all the time, thereby saving the electric quantity of the battery, and thus the UE can save power consumption.

The present embodiment is a schematic structural diagram of a device for reading a system message according to the present invention. This embodiment is similar to the embodiment of FIG. 8, except that:

the receiving unit is specifically configured to receive a paging message containing a system message state value tag in the discontinuous reception (DRX) period;

the determining unit is specifically configured to compare the system message state value tag in the DRX period with the value tag saved by itself; if the two value tags are inconsistent, then it is determined that the system message state changes; or it is determined according to the identifier of the system message state value tag in the DRX period that the system message state changes, the identifier includes indicating directly that the system message changes.

Where the device includes a terminal device in the idle state or a machine type communication (MTC) device.

Figure 9:
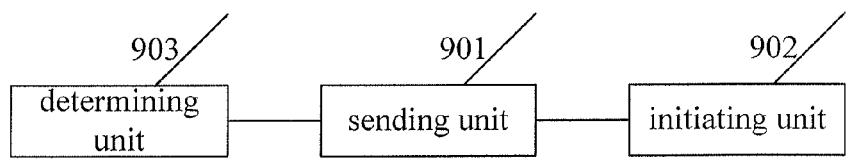
FIG. 9 is a schematic structural diagram of an access device according to the present invention.

FIG. 9 is a schematic structural diagram of a device initiating access according to the present invention. As shown in FIG. 9, the DRX period of the device is larger than a broadcast control channel (BCCH) modification period; the device includes:

a determining unit 903, configured to determine that the area in which it is located currently is not the registered area of the terminal device itself;

a sending unit 901, configured to send, before a service request is initiated to a mobility management entity (MME) or in an access process of initiating the service request, a global unique temporary identity (GUTI) of the device itself to the MME, so that the MME obtains context of the terminal device according to the GUTI; and an initiating unit 902, configured to initiate the service request to the MME after the sending unit sends the GUTI of the device itself to the MME.

For a MTC device UE of which the location update is set to be disabled or reduced, such as a power saving MTC device, it can access through a Service Request message containing the GUTI, thus, even if the Pool is replaced, the new MME can still find and obtain the context of the power saving MTC device through the GUTI. Thus, even if the pool and the MME is replaced for the MTC device UE, the context of the MTC device UE can still be obtained, so that normal services can be provided, and it will not happen that the services cannot be provided because of the lack of context.

The sending unit is specifically configured to initiate a location update request to the MME before initiating the service request to the MME, where the location update request contains the GUTI.

The determining unit 903 is further configured to determine whether the area in which it is located currently is the registered area of the terminal device;

The sending unit is specifically configured to send an ordinary service request message directly if the determining unit determines that the current area is the registered area of the terminal device; the ordinary service request message includes the S-temporary mobile subscriber identity (S-TMSI) of the terminal device, and does not include the GUTI.

Where the device includes a machine type communication device with the requirement of saving power (Power Saving MTC).

Where the device includes a terminal device of which location update, which is initiated because of a change of a location or expiration of a periodic location update timer, is set to be disabled.

The determining unit is specifically configured to compare the system message state value tag in the DRX period with the value tag saved by the device itself; if the two value tags are inconsistent, then it is determined that the system message state changes; or it is determined according to the identifier of the system message state value tag in the DRX period that the system message state changes, the identifier includes indicating directly that the system message changes.

It can be realized by those skilled in the art that, the accompanying drawings are only schematic diagrams of one preferred embodiment, modules or procedures in the accompanying drawings are necessarily required for implementing the present invention.

It can be realized by those skilled in the art that, modules of the device in an embodiment may be distributed in the device of the embodiment according to the description of the embodiments and may also be located in one or more devices through corresponding changes, which differs from the embodiment. Modules of the above-described embodiments may be combined into one module due to convenience of manufacture, and may also be further divided into a plurality sub-modules or units due to the need of design or layout.

Numbers of the above embodiments of the present invention are just for describing, which do not represent the merits of embodiments.

It can be realized by those skilled in the art that, all or part of the steps in the method embodiments can be implemented by hardware under the instruction of a program. The program may be stored in a computer readable storage medium and when the program is executed, the steps in the method embodiments are executed. The storage medium may be any medium that can store a program code, such as a ROM, a RAM, a magnetic disk, or an optical disk, etc.

Finally, it should be noted that the foregoing embodiments are only intended for describing the technical solutions of the present invention rather than limiting the present invention. Although the present invention has been described in detail with reference to the above embodiments, those skilled in the art should understand that they may make modifications to the technical solutions of the above embodiments or make substitutions to some technical features thereof; these modifications or substitutions should not make the essence of corresponding technical solutions depart from the spirit and scope of the technical solutions of embodiments according to the present invention.

It is worth noting that, each unit included in embodiments of the user equipment and the base station is only divided according to functional logic, but not limited to the above division, as long as the corresponding function can be achieved; Further, the specific name of each functional unit is only to facilitate being distinguished from each other, but not intended to limit the protection scope of the present invention.

Furthermore, it can be realized by those skilled in the art that, all or part of the steps in the method embodiments can be implemented by hardware under the instruction of a program. The corresponding program may be stored in a computer readable storage medium. The storage medium may be a read only memory, a RAM, a magnetic disk, or an optical disk, etc.

The above is only preferred implementing modes of the present invention, but the protection scope of the present invention is not limited to this, variations or substitutions which can be easily thought of within the technical scope disclosed by embodiments of the present invention by any person skilled in the art, should fall within the protection scope of the present invention. Accordingly, the protection scope of the present invention should be subject to the protection scope of the claims.

What is claimed is:

1. A method for reading a system message, comprising:
receiving, by a terminal device, a paging message containing a system message state indication in a discontinuous reception (DRX) period, wherein the terminal device comprises a terminal device of which the DRX period is larger than a broadcast control channel (BCCH) modification period, and the terminal device does not wake up in at least one BCCH modification period;
determining, by the terminal device and according to the system message state indication in the paging message, that a system message state changes;
reading and recording, by the terminal device, a system message corresponding to a current BCCH modification period, or, reading and recording a system message corresponding to a next BCCH modification period immediately adjacent to the BCCH modification period; and
performing, by the terminal device, a communication according to the read and recorded system message;
wherein the receiving, by the terminal device, the paging message containing the system message state indication in the DRX period comprises:
receiving, by the terminal device, a paging message containing a system message state value tag in the discontinuous reception (DRX) period;
the determining, by the terminal device and according to the system message state indication in the paging message, that the system message state changes comprises:
comparing, by the terminal device, the system message state value tag in the DRX period with a value tag saved by the terminal device itself, if the two value tags are inconsistent, then it is determined that the system message state changes; or
determining, by the terminal device and according to an identifier of the system message state value tag in the DRX period, that the system message state changes, wherein the identifier comprises indicating directly that the system message changes.

2. The method according to claim 1, wherein the terminal device comprises a terminal device in an idle state or a machine type communication (MTC) device.

3. The method according to claim 1, wherein the system message state indication in the DRX period is a system message state value tag in the DRX period;
the method further comprises:

receiving, by the terminal device, a paging message which does not contain the system message state value tag in the DRX period when the system message state does not change.

4. A device for reading a system message, wherein a DRX period of the device is larger than a broadcast control channel (BCCH) modification period; wherein the device comprises a processor and a non-transitory processor-readable medium which stores computer-executable instructions, wherein the stored computer-executable instructions are executed by the processor to cause the device to perform operations, comprising:

receiving a paging message containing a system message state indication in a DRX period, wherein the device does not wake up in at least one BCCH modification period;

determining, according to the system message state indication in the paging message received by the receiving unit, that a system message state changes;

reading and recording a system message corresponding to a current BCCH modification period, or, reading and recording a system message corresponding to a next BCCH modification period immediately adjacent to the BCCH modification period after determining that the system message state changes; and performing a communication according to the system message read and recorded by the reading and recording unit;

wherein the operations further comprise:

receiving a paging message containing a system message state value tag in the discontinuous reception (DRX) period;

comparing the system message state value tag in the DRX period with a value tag saved by itself; if the two value tags are inconsistent, then it is determined that the system message state changes; or determining, according to identifier of the system message state value tag in the DRX period, that the system message state changes, wherein the identifier comprises indicating directly that the system message changes.

5. The device according to claim 4, wherein the device comprises a terminal device in an idle state or a machine type communication (MTC) device.

6. The device according to claim 4, wherein the system message state indication in the DRX period is a system message state value tag in the DRX period;

the operations further comprise:

receiving a paging message which does not contain the system message state value tag in the DRX period when the system message state does not change.

* * * * *